No. 795,078. Patented July 18, 1905.

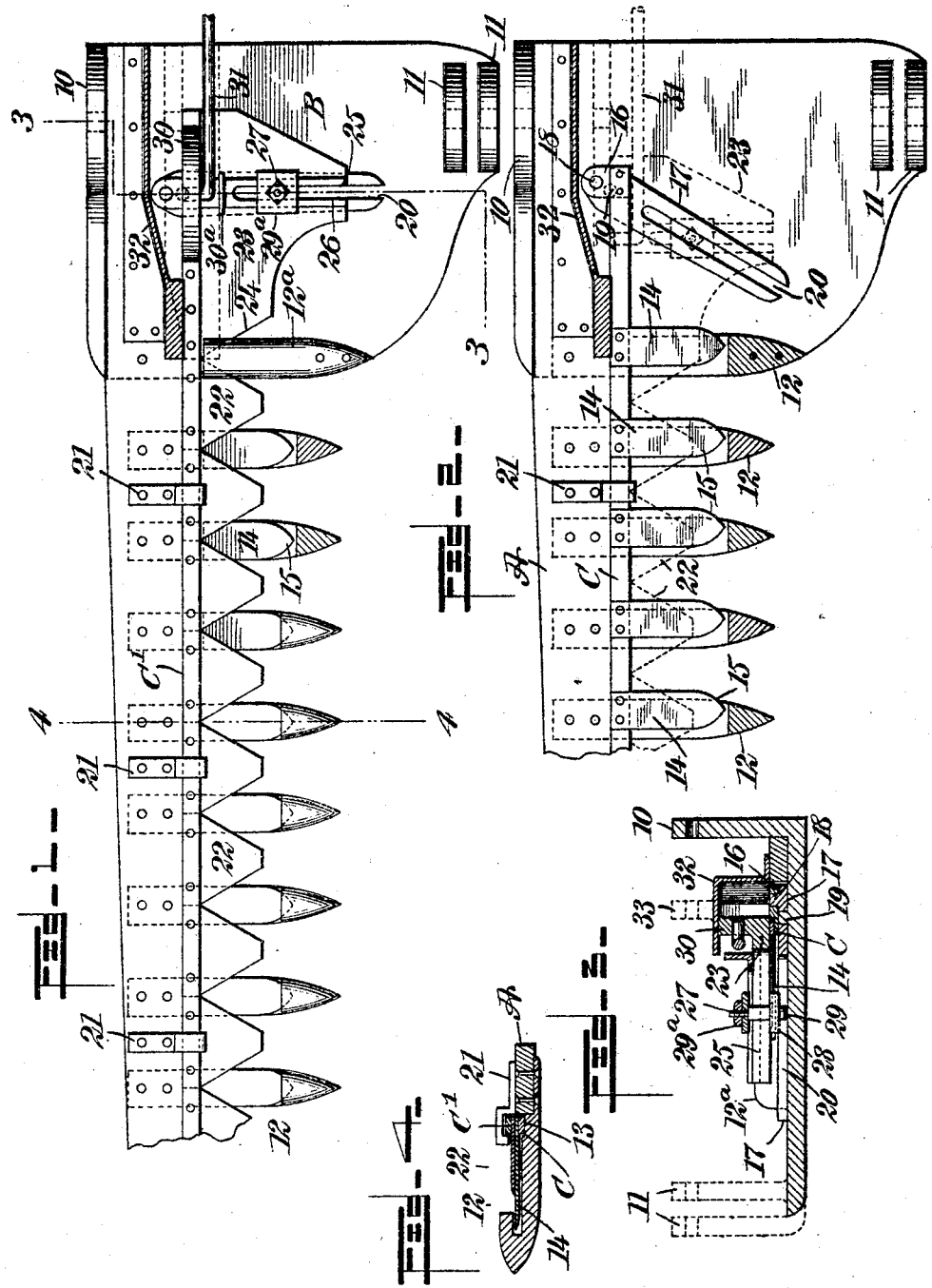

UNITED STATES PATENT OFFICE.

THOMAS R. VIZARD, OF BROOKFIELD, MASSACHUSETTS.

REAPER AND MOWER.

SPECIFICATION forming part of Letters Patent No. 795,078, dated July 18, 1905.

Application filed September 3, 1904. Serial No. 223,275.

*To all whom it may concern:*

Be it known that I, THOMAS R. VIZARD, a citizen of the United States, and a resident of Brookfield, in the county of Worcester and State of Massachusetts, have invented a new and useful Improvement in Reapers and Mowers, of which the following is a full, clear, and exact description.

My invention relates particularly to the cutter-bars of reapers and mowers; and the purpose of the invention is to provide an upper and a lower sickle and mechanism for simultaneously moving the same in opposite directions, so that the cutting is done by the approaching edges of the knives of the two sickle-bars instead of by the customary plates carried by the guard-fingers, thereby insuring a clean and sure cut at each movement of the sickle-bars while the machine is in operation.

Another purpose of the invention is to make the knives of the lower sickle-bar longer than those of the upper sickle-bar and to render the outer ends of the lower knives more or less pointed, the forward pointed portions of the lower knives acting to direct the grain to the cutting-surfaces of coacting upper and lower knives.

A further purpose of the invention is to render the lower sickle-bar removable, so that the knives can be kept sharpened, and to provide for the adjustment of the lower sickle-bar, so that it can be continued in effective use even though the knives are rendered very narrow by constant use and sharpening.

Another purpose of the invention is to provide such a construction of cutter-bar that the jar in operation will be reduced to a minimum, first, because the knives can be kept in a sharp condition and the grass therefore easily cut, and, second, because the grass is cut by two coöperating knives by a shearing action and not, as usual, by the action of a knife relative to a fixed plate secured to a guard-finger, which plate frequently buckles or becomes bent, and wherein under the improvement the knives cut at points between the guard-fingers.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a plan view of a portion of the cutter-bar, parts being in section. Fig. 2 is a horizontal section through the guard-fingers of the cutter-bar, showing the lower sickle-bar in plan view and in full lines and the knives of the upper sickle-bar in dotted lines, the position of the upper and lower knives being that which they assume during the act of cutting. Fig. 3 is a transverse section taken substantially on the line 3 3 of Fig. 1, and Fig. 4 is a transverse section taken practically on the line 4 4 of Fig. 1.

A represents a cutter-bar of the usual type, being provided at its inner end with the customary head B, by means of which head the cutter-bar is pivotally connected with the body of the machine, and to that end the said head B is provided with an apertured lug 10 at its rear end and apertured lugs 11 at its forward end, which lugs are adapted to receive the pivot-pin hinging the cutter-bar to the machine proper. The cutter-bar is provided with the customary forwardly-extending guard-fingers 12; but these guard-fingers 12 where they connect with the cutter-bar and just in front of the cutter-bar are provided with transverse recesses 13 in the lower faces of their open portions, as is shown in Fig. 4, and in these recesses 13 a lower sickle-bar C has end movement parallel with the cutter-bar, and the upper face of the sickle-bar C is substantially flush with the corresponding face of the cutter-bar A, as is also shown in Fig. 4. A series of knives 14 is carried by the said sickle-bar C, the upper faces of the knives being flush with the upper face of the bar, and these knives 14 are separated one from the other a distance equal to that intervening between the guard-fingers 12, so that in one position of the knives 14 a knife will be within each of the guard-fingers, as is illustrated in Fig. 1; but this position of the knives 14 is not their cutting position, as said knives 14 do not cut until they have been carried beyond one or the other of the side edges of the guard-fingers 12, occupying at such time practically the position illustrated in Fig. 2.

The knives 14, carried by the sickle-bar C, are of a width corresponding to the width of the guard-fingers 12, and the knives 14 are further provided with more or less pointed outer ends 15; but throughout the major portion of the length of the knives 14 their side cutting edges are straight and parallel, as is clearly shown in Fig. 2.

The inner end of the sickle-bar C, which is actually the lower sickle-bar, extends over the head B of the cutter-bar A, as is also shown in Fig. 2, and at the inner end of the sickle-bar C a rearwardly-extending lug 16 is provided, which lug 16 is mounted to turn on a pivot-pin 18, carried by the rear portion of a forked lever-arm 17 or that portion of the lever-arm 17 which extends rearward of the sickle-bar, and the said forked lever-arm 17 is pivoted to the upper face of the head B of the cutter-bar by means of a suitable pin 19, (shown in Figs. 2 and 3,) the pivot-pin engaging with the forked lever-arm 17 slightly in advance of the pivot-pin 18 and somewhat to the rear of the sickle-bar C, as is clearly shown in Fig. 2. The lever-arm 17 is forked at its forward portion by producing a longitudinal slot 20 therein which extends to a point near the sickle-bar C and out through the forward end of the arm, as is shown in Figs. 1 and 2.

An upper sickle-bar C' is also employed. This upper sickle-bar C' has end movement upon the lower sickle-bar C and is guided in its movement by guide strips or brackets 21, secured to the upper face of the cutter-bar and extending forward over the upper sickle-bar, as is shown in Figs. 1 and 4. The knives 22, carried by the upper sickle-bar C', are of the conventional shape, being more or less triangular, and one knife abuts against the other at their rear side portions, as is shown in Fig. 1. The pointed portions of the knives 14 of the lower sickle-bar C extend beyond the forward ends of the knives 22, carried by the outer sickle-bar C'. The straight side edges of the knives 14, carried by the lower sickle-bar C, are practically of the same length as the longitudinal length of the knives 22. Normally the two sets of knives when inactive bear the relation to each other shown in Fig. 1, wherein it will be observed that the knives 14 of the lower sickle-bar are within the guard-fingers and the major or forward portions of the knives 22 of the upper sickle-bar are between the guard-fingers. These two sickle-bars are adapted to have simultaneous movement in opposite directions, and such movement is accomplished in the following manner: A head-plate 23 forms a continuation of the inner end of the upper sickle-bar C', the sickle-bar C' being secured to the rear edge of the head-plate 23, as is shown in Fig. 1. The outer side edge 24 of this head-plate 23 is sharpened to form a cutting edge and operates through a guard-finger $12^a$, which is secured to the upper face of the head B of the cutter-bar at its outer edge, so that the grass will be cut close up to the main head B. The head-plate 23 is provided with a slot 25, extending from its forward edge in direction of its rear edge, and when the sickle-bars are in the normal position (shown in Fig. 1) this slot 25 registers with the slot 20, forming the forked end of the lever-arm 17. Preferably a rib 26 surrounds the walls of the slot 25, the rib being constructed on the upper face of the said head-plate 23. A pin 27 is passed through the slot 25 in the head-plate 23, being provided near its lower end with a head 28, adapted to engage with the under face of the head-plate 23, as is shown in Fig. 3, and the lower end 29 of the said pin 27 enters the slot 20 in the forked lever-arm 17. A nut and washer $29^a$ are located upon the upper end of the said pin 27, which is threaded, as is shown in Fig. 3, and the washer, which is in the form of a cap, is adapted to straddle the marginal rib 26 for the slot 25 in the head-plate 23. By this connection it will be observed that when the upper sickle-bar C' is laterally reciprocated or is given end movement end movement is also imparted simultaneously to the lower sickle-bar C through the medium of the forked lever 17, but that of necessity the two bars will move in opposite directions. Such movement is brought about by pivoting a pitman 31, connected with the driving mechanism of the machine, in a lug 30, which extends up from the rear edge portion of the head-plate 23, and this pitman is prevented from leaving the lug 30 by placing a guard-plate $30^a$ on the said head-plate 23 just in front of the outer crank end of the pitman, which enters the said lug 30, as is shown in Figs. 1 and 3.

A housing 32 is erected on the head B of the cutter-bar at the rear of the sickle-bars, which housing extends up over the lug 30, carrying the pitman, and protects the sickle-bars where they operate on the head B of the cutter-bar, as is shown in Fig. 3. Preferably on this housing, as is shown in Fig. 3, an apertured lug 33 is located, and the pivot-pin heretofore referred to as connecting the cutter-bar with the body of the machine passes through the aperture in this lug 33, as well as the apertures in the lugs 10 and 11, heretofore alluded to.

In the operation of the device the cutting action does not take place between the knives of the upper and the knives of the lower sickle-bar until the knives of the lower sickle-bar have passed out beyond the side edges of the guard-fingers to a greater or lesser degree, and in this manner a shear cut is obtained between the two sets of knives at both end movements of the sickle-bars and the ordinary plates attached to the guard-fingers against which it is customary to cut are dispensed with, and consequently all danger of impeded action of the sickle-bar is avoided, as there are no such plates to be accidentally bent up or to accidentally buckle or otherwise interfere with the proper movement of the knives on the sickle-bar.

It is obvious that by disconnecting the lower sickle-bar from its operating mechanism this bar can be readily withdrawn from the cutter-bar and the knives 14 sharpened, and by thus keeping the knives in a sharp condition the work of cutting is rendered easy and the machine sustains a minimum amount of jar. It will also be obvious that by moving the pin 27, establishing communication between the head-plate 23 of the upper sickle-bar and the forked lever 17 of the lower sickle-bar, the throw of the lower sickle-bar is under complete control and that the throw of such bar can be readily increased as the knives 14 become worn through constant usage and much sharpening, thus enabling the knives to be utilized until they are exceedingly narrow and, furthermore, enabling knives to be employed which could not be utilized on ordinary cutter-bars.

Having thus described my invention, I claim as new and desire to secure by Letters Patent—

1. A cutter-bar and its guard-fingers, an upper and a lower sickle-bar, knives for the same, the knives on the lower sickle-bar being longer than the knives on the upper sickle-bar and having straight and parallel side cutting edges throughout the greater portion of their length, means for simultaneously moving said sickle-bars in opposite directions, and means for regulating the throw of the lower sickle-bar.

2. A cutter-bar and its guard-fingers, a lower sickle-bar, an upper sickle-bar, connected knives carried by the upper sickle-bar, spaced knives carried by the lower sickle-bar, a slotted head-plate for the upper sickle-bar, a pitman connected with the said head-plate, a rearward extension from the lower sickle-bar, a forked lever fulcrumed upon the cutter-bar and pivoted to the said extension, and a pin carried by the slotted portion of said head-plate and extending into the fork portion of said forked lever.

3. A cutter-bar, its guard-fingers and a head for the cutter-bar, an upper and a lower sickle-bar mounted to slide one over the other, the inner ends of the said sickle-bars extending over the head of the cutter-bar, spaced knives on the lower sickle-bar, the spacing of the knives corresponding to the spacing of the guard-fingers, connected knives on the upper sickle-bar, a driving device for the upper sickle-bar, a driving connection between the two sickle-bars, operating one sickle-bar in a reverse direction to the other, the said driving connection comprising a forked lever pivoted on the head of the cutter-bar and connected with the said lower sickle-bar, and a pin carried by the upper sickle-bar and engaging the said forked lever, the said pin being adjustable to regulate the throw of the lower sickle-bar.

4. A cutter-bar, its guard-fingers and a head for the cutter-bar, an upper and a lower sickle-bar mounted to slide one on the other, the inner ends of the sickle-bars extending over the head of the cutter-bar, connected knives carried by the upper sickle-bar, spaced knives carried by the lower sickle-bar, the spacing of the knives on the lower sickle-bar corresponding to the spacing of the guard-fingers, said knives on the lower sickle-bar being longer than the knives on the upper sickle-bar and provided with straight side cutting edges and a pointed outer end to facilitate directing the grass to the cutting edges of the knives, a driving device for the upper sickle-bar, a driving connection between the upper and the lower sickle-bars, operating to move the said sickle-bars in opposite directions, corresponding knives on the two sickle-bars being brought into cutting relation in the spaces between the guard-fingers, and means for regulating the throw of the lower sickle-bar.

5. A cutter-bar and its guard-fingers, an upper and a lower sickle-bar mounted to slide one on the other, knives carried by the upper sickle-bar, spaced knives carried by the lower sickle-bar, the knives on the lower sickle-bar being longer than the knives on the upper sickle-bar and having straight and parallel side cutting edges throughout the major portion of their length, and means for simultaneously moving said sickle-bars in opposite directions.

6. A cutter-bar and its guard-fingers, an upper and a lower sickle-bar, knives for the same, a slotted head-plate for the upper sickle-bar, and means for simultaneously moving said sickle-bars in opposite directions, the said means comprising a driving device for the upper sickle-bar, a forked lever fulcrumed on the cutter-bar and pivotally connected with the lower sickle-bar, and an adjustable connection between the slotted portion of the head-plate of the upper sickle-bar and the said forked lever.

In testimony whereof I have signed my name to this specification in the presence of two subscribing witnesses.

THOMAS R. VIZARD.

Witnesses:
GEORGE L. TWICHEL,
ALBERT G. DOUTY.